(12) United States Patent
Kotelko et al.

(10) Patent No.: US 7,771,598 B2
(45) Date of Patent: Aug. 10, 2010

(54) APPARATUS, METHODS AND SYSTEMS FOR HANDLING AND PROCESSING WASTE MATERIAL

(75) Inventors: Mike Kotelko, Vegreville (CA); Peter Kotelko, Vegreville (CA)

(73) Assignee: Highmark Renewables Research Limited Partnership, Vegreville, Alberta (CA)

( * ) Notice: Subject to any disclaimer, the term of this patent is extended or adjusted under 35 U.S.C. 154(b) by 135 days.

(21) Appl. No.: 12/004,686

(22) Filed: Dec. 21, 2007

(65) Prior Publication Data

US 2009/0159529 A1 Jun. 25, 2009

(51) Int. Cl.
*C02F 3/28* (2006.01)
*C02F 11/04* (2006.01)
*B09B 3/00* (2006.01)

(52) U.S. Cl. .................. 210/613; 210/175; 210/223; 210/259; 209/213; 209/930

(58) Field of Classification Search ........... 210/603, 210/612, 613, 767, 768, 772, 774, 780, 173, 210/174, 222, 223, 252, 259, 175; 209/930, 209/213; 71/10
See application file for complete search history.

(56) References Cited

U.S. PATENT DOCUMENTS

| | | | | |
|---|---|---|---|---|
| 2,188,847 A * | 1/1940 | Streander | ............ | 210/603 |
| 2,903,131 A * | 9/1959 | Heinrichs | ............ | 209/3 |
| 4,303,412 A | 12/1981 | Baikoff | | |
| 4,577,996 A * | 3/1986 | Elias et al. | ............ | 405/17 |
| 5,297,741 A | 3/1994 | Zurn et al. | | |
| 5,337,965 A | 8/1994 | Chiovitti | | |
| 5,476,994 A * | 12/1995 | Trezek | ............ | 588/256 |
| 5,478,473 A * | 12/1995 | Oshima | ............ | 210/617 |
| 5,607,060 A * | 3/1997 | Fristad et al. | ............ | 209/12.2 |
| 5,762,449 A * | 6/1998 | Hey | ............ | 405/81 |
| 6,136,590 A * | 10/2000 | Kruse | ............ | 435/262 |
| 6,403,364 B1 * | 6/2002 | Hince | ............ | 435/262.5 |

(Continued)

FOREIGN PATENT DOCUMENTS

GB 2301112 A 11/1996

(Continued)

OTHER PUBLICATIONS

International Search Report of PCT/IB2008/003526 mailed Apr. 21, 2009.*

(Continued)

*Primary Examiner*—Fred Prince
(74) *Attorney, Agent, or Firm*—McCarter & English, LLP; Maria Laccotripe Zacharakis; Yu Lu

(57) ABSTRACT

Apparatus, methods and systems for processing waste are provided. For example, a system for processing waste, wherein the waste comprises hard particulates embedded therein, can be provided. The system can comprise a waste disruptor, wherein the waste disrupter disrupts the waste and releases at least one of the embedded hard particulates from the disrupted waste; a segregator, wherein the segregator segregates at least one of the released hard particulates from the waste; and a dilution unit, wherein the dilution unit dilutes the waste. In some embodiments, the system can include a waste loader that provides waste continuously to the waste disrupter, which is configured to disrupt at least a portion of the continuously provided waste.

38 Claims, 5 Drawing Sheets

U.S. PATENT DOCUMENTS

| | | | | |
|---|---|---|---|---|
| 6,423,532 | B1 * | 7/2002 | Rindelaub | 435/262.5 |
| 7,014,768 | B2 | 3/2006 | Li et al. | |
| 2002/0092799 | A1 * | 7/2002 | Storruste | 209/460 |
| 2004/0164021 | A1 * | 8/2004 | Li et al. | 210/603 |

FOREIGN PATENT DOCUMENTS

| WO | WO-93/23170 A1 | 11/1993 |
|---|---|---|

OTHER PUBLICATIONS

Pratt, Shelia, "Good, old-fashioned manure is province's new black gold. Breakthrough biorefinery near Vegreville, a working carbon market set new standards", The Edmonton Journal, www.edmontonjournal.com/story_print.html?id=1266220&sponsor=, Feb. 8, 2009.

Pratt, Shelia, "'Virtuous' power. Cattle manure and Alberta ingenuity are combining to produce a fledgling alternative energy economy", The Edmonton Journal, www.edmontonjournal.com/story_print.html?id=1266353&sponsor=, Feb. 9, 2009.

The Edmonton Journal, "Use of manure power improves ethanol plant's carbon footprint", www.edmontonjournal.com/story_print.html?id=1266359&sponsor=; Feb. 8, 2009.

* cited by examiner

APPARATUS, METHODS AND SYSTEMS FOR HANDLING AND PROCESSING WASTE MATERIAL

BACKGROUND OF THE INVENTION

The present invention relates to apparatus, methods and systems for handling and processing waste material.

Organic waste material, such as municipal wastewater or livestock manure, can present problems when generated on a large scale. For example, organic waste material can pose both a health risk and a nuisance. Decomposing organic waste can also release greenhouse gases, such as methane and carbon dioxide. Organic waste material can also be a potential source of air and water contamination. Thus, strategies for dealing with organic waste in such quantities are needed.

One possible solution for the problem of organic waste material is converting or processing the waste into less environmentally noxious or hazardous forms. Such processes may result in useful products derived from the waste, either by converting the waste to such products or extracting products therefrom. Furthermore, many such processes involve subjecting the waste to controlled processes, thereby allowing control and capture of undesirable by-products, such as greenhouse gases, and isolation of the waste from the environment.

However, compared to other feedstocks, organic waste can be a difficult material to handle and work with during such processes. Typically, waste can be highly heterogeneous in its composition. For example, livestock manure can include significant quantities of indigestible non-cellulosic plant matter (e.g. straw, wood) and hard particulates (e.g. sand, rocks and metal), all of which can be agglomerated with the manure. These extraneous components can cause difficulties in handling, or interfere with mechanical, chemical, and biological processes. Organic waste can also have very high solid content, thereby making it more difficult to handle and convey compared to more liquefied materials.

Although current methods attempt to address the aforementioned and other problems of handling and processing organic waste, these methods have deficiencies. For example, such quantities of organic waste are usually subjected to batch processing, due to the limited capacity of waste that can be handled at a given time. However, batch processing can result in lower efficiency, productivity, or both, due to the need for periodic downtime that results from recharging the batch process with new feedstock, and removal of processed material.

In view of the foregoing, it would be desirable to have apparatus, methods, and systems for processing waste in a more efficient manner.

It would also be desirable to have apparatus, methods, and systems for processing organic waste material to improve handling of said waste material.

It would also be desirable to have apparatus, methods, and systems for removing undesirable contaminants from organic waste material prior to processing.

SUMMARY OF THE DISCLOSURE

Apparatus, methods, and systems for handling and processing organic waste material are provided. The present invention includes apparatus, methods, and systems for processing waste, in which at least a portion of the waste is disrupted to release embedded hard particulates, and the released hard particulates are segregated therefrom. The processed waste can then be diluted to decrease the solid content. Also provided are apparatus, methods, and systems that break up bulky structures contained in the waste, such as lignin, prior to dilution.

For example, a system, method, or apparatus for processing waste, wherein the waste contains hard particulates embedded therein, can be provided. The system, method, or apparatus can include or use a waste disruptor, wherein the waste disrupter disrupts at least a portion of the waste and thereby releases at least one of the embedded hard particulates from the disrupted waste; a segregator, wherein the segregator segregates at least one of the released hard particulates from the waste; and a dilution unit, wherein the dilution unit dilutes the waste with a liquid diluent.

In some embodiments, the system, method, or apparatus can include or use a waste loader that provides waste continuously to the waste disrupter, which is configured to disrupt at least a portion of the continuously provided waste.

In some embodiments, the segregator is configured to segregate at least one of the released hard particulates based upon a predetermined minimum size of the released hard particulate. For example, the segregating can be performed by size exclusion between the disrupted waste and the hard particulates. For example, a suitably-sized sieve can be used to retain released hard particulates of a given size, while allowing smaller disrupted waste to pass therethrough.

In other embodiments, segregation by size exclusion can occur by subjecting waste with embedded hard particulates to a size-limited aperture or entrance, such that only the smaller-sized waste are able to pass through. Larger, released hard particulates are not able to pass through, and thus can be deflected or diverted from the waste to another location, thereby segregating the particulates from the waste. In some embodiments, waste can be impelled or otherwise urged towards to the size exclusion structure so that the waste is also disrupted. In this manner, disruption and segregation can occur using the same component structure.

In some embodiments, the waste disrupter can disrupt the waste by impacting the waste with another object. In certain embodiments, the organic waste further comprises metal contaminants, and the system, method, or apparatus can remove at least one of the metal contaminants from the waste. In certain embodiments, at least one of the metal contaminants can be magnetically removed.

In some preferred embodiments, the waste disrupter includes a disrupter bar, wherein the disrupter bar is positioned above an open auger conveying the waste. Waste being conveyed by the auger can be disrupted upon impact with the disrupter bar, thereby releasing at least one of the embedded hard particulates. In some preferred embodiments, the disrupter entails depositing the waste on a mechanical rotary screener or like apparatus, thereby releasing at least one of the embedded hard particulates. The rotary screener can also be configured to segregate disrupted waste from larger hard particulates, in which the rotary screener is sized to permit the smaller-sized waste to pass through, and larger particulates are conveyed off of the rotary screener.

In other embodiments, the dilution unit may convey the waste after dilution to an anaerobic bio digester. In certain embodiments, the liquid diluent can be liquified biodigestate, such as that produced by an anaerobic bio-digester. In some embodiments, the dilution step can involve diluting the waste until the solid content of the waste is about 12-13%. The waste may in some embodiments also be heated. The waste may in some embodiments be mixed. Heating the waste may in some embodiments be performed by diluting the waste with a liquid diluent having a higher temperature than the waste. In some embodiments, the diluting waste step can further comprise paddle mixing the diluted waste.

BRIEF DESCRIPTION OF THE DRAWINGS

The above and other advantages of the present invention will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
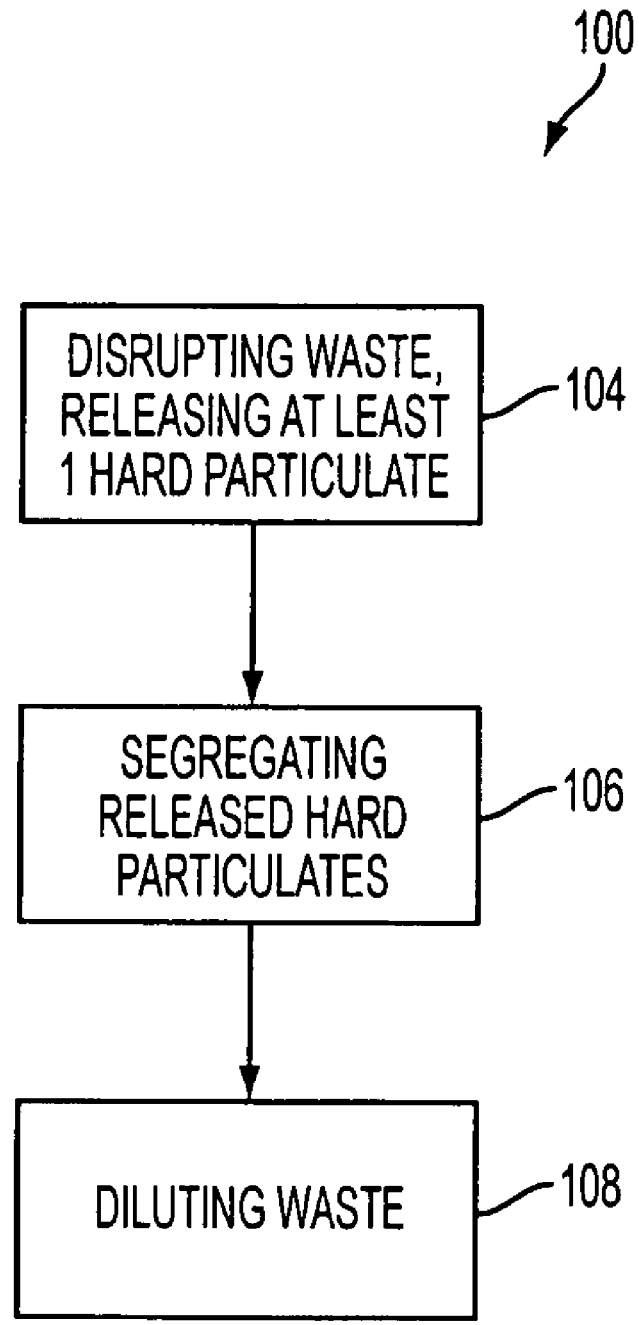
FIG. 1 is a flow chart illustrating an exemplary process for processing waste in accordance with an embodiment of the present invention.

Apparatus, methods and systems for processing waste are provided and described with reference to FIGS. 1-5.

Waste, as referred to herein, may be any suitable material that includes organic and organically-derived matter. For example, waste can include by-products from industries such as agriculture, food processing, animal and plant processing, and livestock. The waste produced by these and other industries include, but are not limited to: livestock manure, animal carcasses and offal, plant material, wastewater, sewage, food processing waste, and any combination thereof. Waste can also include human-derived waste, such as sewage and wastewater, discarded food, plant or animal matter, and the like. Thus, waste used in the present invention can be, and typically is, a mixture of normally-discarded organic matter.

The waste may be provided from any suitable source, including those described hereinabove. In certain embodiments, the waste source is proximate to the processing location. For example, the present invention may process waste generated by a nearby feedlot or wastewater treatment plant. Such proximity may allow efficient and rapid processing at the waste. This proximity may also advantageously reduce the amount of time the waste is idle prior to processing, thereby reducing its potential to act as an environmental nuisance or hazard. In certain embodiments, waste to be processed may be provided from a location or source more distant from the processing location. The latter positioning may be suitable in cases where the processing location is positioned in a central location to process waste from multiple sources that are situated in the local neighborhood or region.

Waste that is processed in accordance with the present invention may be a complex, heterogeneous mixture that can be difficult to handle. For example, livestock manure can be collected in large quantities from feedlots or other large populations of animals. Such manure, being an animal waste product, is already a complex mixture of substances. Moreover, manure may also acquire additional contaminants prior to and during its collection. These contaminant can include, for example, bedding straw, rocks and dirt from the ground, garbage, and other debris. Other non-manure contaminants are possible. Furthermore, other types of organic waste, including those described herein, each have their own risks of collecting heterogeneous contaminating material, or already include such material due to their origin or any preliminary processing.

These contaminants can be either organic or is inorganic in nature. However, such contaminants, if present in the waste in significant quantities, can present several difficulties in view of any further processing of the waste. For example, certain contaminants, such as rocks and metal, may be incompatible with further processing intended for the waste. For example, metal and rocks, unlike organic waste, will not undergo biological digestion or decomposition, and thus will end up as inert remnants of such processes. In addition, these contaminants, such as rocks and metals which are generally more resistant to physical forces, may present physical hazards or impediments to subsequent processes, or pose a potential to damage equipment used in such further processing. In addition, rock and metal contaminants are also generally insoluble, and thus will impede handling of the waste in liquid form. Therefore, the present invention may provide a solution to reduce, if not minimize, the problems caused by such contaminants. Contaminants of this type are referred to herein as "hard particulates."

However, removing such hard particulates from the waste can be difficult. For one, hard particulates can be embedded into the organic waste. As a result, merely handling the waste does not necessarily dislodge the particulates sufficiently to allow their removal. Further, organic waste typically has a water content that results in adhesion to the embedded hard particulates, thereby making their removal more difficult.

A possible solution to the problem of embedded hard particulates in to dilute the organic waste by increasing its water content, whereby the solid content of the waste is reduced. By diluting the waste to a sufficient degree, the embedded hard particulates may be released from the waste solids and allowed to settle out. Furthermore, dilution can facilitate, and may even be required for, subsequent processing of the waste.

The present invention can address these and other concerns, as illustrated in FIG. 1. This figure shows a flow chart illustrating an exemplary process for processing waste in accordance with the present invention.

The present invention includes releasing embedded hard particulates from waste by disrupting the waste. In preferred embodiments, this disruption occurs prior to substantial dilution of the waste. Thus, for example, the waste may remain in a low-moisture/high-solid form. By disrupting the waste in this manner, the present invention can improve on dilution by reducing the need for pre-processing prior to disruption. Other improvements can include: preventing the increase of the total volume of the waste to an impractical amount (which can increase the costs and burden of conveying the diluted waste), reducing the potential need for additional processes to retrieve and remove the released particulates, such as by settling (which can be time-consuming), and allowing continuous processing to be done, instead of relying solely upon batch processing. Continuous processing can reduce idle time, where waste is not processed, and can thereby avoid further decomposition of the organic material within the waste, which can lead to reduced yield of useful products recovered from the waste.

In some embodiments, pre-processing of the is waste may be performed, such as the addition of supplements to the waste. Such supplements can be useful in processes that are subsequent to the disruption and segregation processes supplements, can include, for example, glycerol and liquid biodigestate from an anaerobic bio-digester.

Furthermore, the present invention can be advantageous because it can enable continuous processing of waste. Continuous processing can reduce or eliminate down time and increase throughput. Also, such increased efficiency may also reduce decomposition of the organic prior to biodigestion.

At step 104 of process 100, at least a portion of the waste is disrupted, thereby releasing at least one of the embedded hard particulates from the disrupted waste. Disruption of the waste in this context means mixing, breaking up, fracturing, fragmenting, crushing, impacting, tumbling, flattening, or any other like processes. By these processes, embedded hard particulates are increasingly released, and separated from the bulk of the waste until released, and the smaller, disrupted waste is less capable of re-embedding or retaining the hard particulates.

Waste disruption at step 104 can be performed by any suitable apparatus, device, or process. For example, in certain embodiments, devices that physically interact with the waste are used. Such devices can include, for example, devices that implement actions such as mixing, breaking-up, crushing, fracturing, impacting, fragmenting, tumbling, flattening, and the like. These actions may involve direct physical intervention in the waste (e.g. is mixing), or manipulating the waste in a manner that results in its disruption (e.g. tumbling). Other suitable devices may implement more than one of these actions, either simultaneously or sequentially. A suitable device for performing step 104 may also disrupt the waste in a processive manner, in which the initial waste provided is disrupted to a given degree, and then, as it proceeds through the device, undergoes increasing degrees of disruption. In this manner, waste may be processed in a more continuous fashion, and the extent of desired waste disruption can result from the configuration of the device used.

Other embodiments of the waste-disrupting apparatus can include devices generally used to fragment large material into smaller material, such as an impact crusher, a gyratory crusher, a jaw crusher, or a cone crusher, as are known in the art.

As described above, waste may contain other materials which, although they may be different than the hard particulates, may still disrupt subsequent processes performed on the waste. For example, livestock manure may contain a significant amount of bedding straw. Straw, like wood, is composed of a non-cellulosic material (lignin) that is more resistant to digestion or decomposition. Furthermore, due to its relatively large size, straw is conducive to forming larger mats and plugs that can interfere with subsequent processes. Breaking up the straw into smaller fragments may reduce or limit this problem.

Accordingly, a further advantage of the present invention is that the disruption step may also break up other matter in the waste, such as straw and other amenable materials. The break-up or disruption of such structures may reduce or preclude their interference with later waste processing steps, and may obviate the need for additional processes to specifically perform this break-up.

It should be noted that at any step of process 100, co-substrates and/or supplements can be added to the waste. These co-substrates and/or supplements can comprise organic material, and other supplemental compounds that can facilitate either the handling of the waste or downstream processing of the waste. Addition of co-substrates and/or supplements prior to or concurrent with disruption step 104 may be desirable in some embodiments, as the disruption step may also act to mix the co-substrates and/or supplements with the waste.

At step 106, hard particulates released from the disrupted waste at step 104 are segregated from the waste. In step 104, any suitable device that can distinguish and separate the released hard particulates from the disrupted waste may be suitable. For example, the segregation step may rely on differences in size, diameter, hardness, specific gravity, solubility, mobility, frictional coefficient, and any other suitable property or combination thereof. A suitable device may distinguish the disrupted waste from the released hard particulates based on multiple criteria, either concurrently or serially.

For example, in some embodiments of the present invention, the released hard particulates may be segregated from the disrupted waste based upon their respective sizes. An exemplary suitable device for such a segregation can use a sieve, or any other structure having one or more size-excluding openings or gaps. Such a structure may have openings chat are sized to retain hard particulates having a minimum mean diameter. A suitable mean diameter of the retained particulates can be, for example, greater than 1, 2, 4, 8, 12, 16, or 20 centimeters. A preferred mean diameter is about 8 centimeters. The desired gap or opening size is also configured not to retain the disrupted waste, thereby allowing the disrupted waste to be passed through the size-excluding structure.

In certain embodiments, the segregation of the waste may be performed in a processive manner, in which the disrupted waste proceeds through the suitable device, and is subsequently subjected to different segregation criteria.

It is understood that the present invention also embraces embodiments in which steps 104 and 106 are performed concurrently or substantially concurrently. Thus, in such embodiments, the devices used in steps 104 and 106 may be integrated, or may even be the same device.

At step 108, the disrupted waste is diluted with a liquid diluent. In certain embodiments, this step follows the segregation of the disrupted waste from the released hard particulates. This step can prepare the waste for further, subsequent processing steps. In addition, by decreasing the solid content of the waste, the waste may become easier to handle and transport. Decreasing the solid content of the waste also may be required for processes such as anaerobic biodigestion of the waste, as is known in the art (examples of which are described in U.S. Pat. No. 7,014,768, the contents of which are incorporated herein by reference in its entirety).

In some embodiments, the waste can be diluted to a solid content of about 5%, about 6%, about 7%, about 8%, about 9%, about 10%, about 11%, 12% about 13%, about 15%, about 17%, about 20%, about 25%, about 50%, or any other suitable amount. A preferred solid content is about 12% to 13%. The liquid diluent may be any suitable liquid, such as water. In some embodiments, other liquids, such as complex liquids derived from other processes may be used, or fed back, to act as a diluent. Use of such complex liquids may act as a source of supplemental components or co-substrates to be mixed with the waste. For example, liquid biodigestate (or any suitable component thereof) from an anaerobic biodigester is preferred as the diluent, or the diluent may be composed in part of biodigestate. The addition of biodigestate-derived liquid to the waste may enhance the subsequent biodigestion of the waste, and may also improve the mixing characteristics of the waste.

Figure 2:
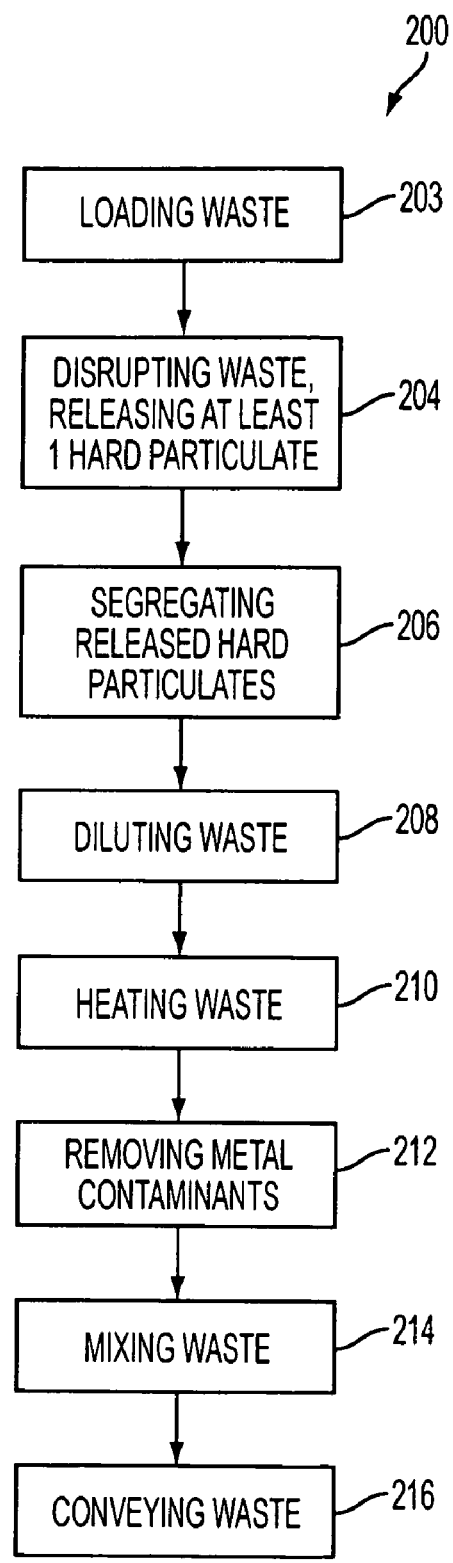
FIG. 2 is a flow chart illustrating an exemplary process for processing waste in accordance with an embodiment of the present invention.

FIG. 2 is a flow chart illustrating an exemplary embodiment of a process for processing waste in accordance with an embodiment of the present invention. At step 203, waste, comprising hard particulates embedded therein, is loaded. In some embodiments, the loading step is performed by a suitable device or apparatus that conveys waste to the device or apparatus performing step 204, the disruption step. In embodiments in which the disruption step has a limited capacity to handle waste, the device performing the loading step can regulate the amount of waste so as to supply a suitable amount oat waste at a suitable rate. For example, the loading of waste can be provided continuously or in batches. Exemplary devices for loading and providing waste include, without limitation, a hopper, a conveyor belt, and the like.

Steps 204, 206, and 208 generally may be similar to steps 104, 106, and 108 from FIG. 1, as described hereinabove.

At step 210, the diluted waste may be heated within the dilution unit. Heat can be provided by heating a vessel in which the diluted waste is being held. In some embodiments, heat can be provided by heating at least some of the diluents used during the dilution step, wherein the liquid diluent has a higher temperature than the waste. In this manner, heating of the waste can occur essentially concurrently with its dilution (i.e. steps 208 and 210). The liquid can be heated by an external heating apparatus or can be heated as part of, or derived from, an exothermic biological or chemical process.

At step 212, metal contaminants may be removed from the diluted waste. It is understood that some or all of the metal contaminants may have already been removed during the segregation step, as metal contaminants may share certain properties with hard particulates that would permit their selection and segregation from the disrupted waste. In some embodiments, a magnet may be used to extract ferromagnetic metal contaminants. In some embodiments, the magnet may guide or deflect the metal, so that the metal is retained when the diluted waste is conveyed out or removed from this step, thereby segregating them from the diluted waste.

At step 214, the diluted waste is mixed within a dilution unit. The mixing at step 214 can take place for a predetermined amount of time, or until a desired consistency or state of the diluted waste is achieved, in some embodiments. In other embodiments, this mixing can be done concurrently with the diluting step 208.

It is understood that in some embodiments, any two or more of steps 208, 210, 212 and 214 may be performed essentially concurrently. For example, in a single container, the disrupted waste may be diluted and mixed, while heat is introduced and metal contaminants are removed. In some embodiments, any two or more of these steps may be performed in overlapping phases. In some embodiments, a single integrated device may perform any two or more of these steps, either sequentially or essentially concurrently. In some embodiments, a single device may perform two or more of these steps, but where the steps are performed serially or in overlapping steps.

It is also understood that, in some embodiments, steps 208, 210, 212 and 214 need not be performed in the order shown, and thus may be performed in any suitable order. For example, in some embodiments, the diluted waste may be mixed (step 214) prior to removing the metal contaminants (step 212). In this example, these steps may be performed sequentially, or the subsequent step may overlap with the prior step. In some embodiments, any suitable combination of steps can be performed simultaneously, which can yield greater efficiency. For example, in some embodiments, step 212 and step 214 can be performed simultaneously, which can yield greater efficiency both with respect to time and device utilization.

At step 216, the diluted waste can be conveyed or removed from the dilution unit. This step can be performed by any device that is configured or suitable for conveying liquefied or semi-solid material. The device or apparatus may rely on passive conveyance (e.g. gravity-driven flow) or active conveyance (e.g. pumps, conveyer belts, etc.), or any suitable combination thereof. In some embodiments, the device or apparatus may be configured so that smaller or otherwise minor particulates, such as sand or sawdust, can be conveyed without causing significant impedance, damage or disruption. Accordingly, segregation step 106 or 206 may be configured such that minor particulates that will not result in such impedance, damage or disruption need not be segregated. Such coordination between these, as well as other steps, may improve the efficiency and/or the throughput of the overall process.

Figure 3:
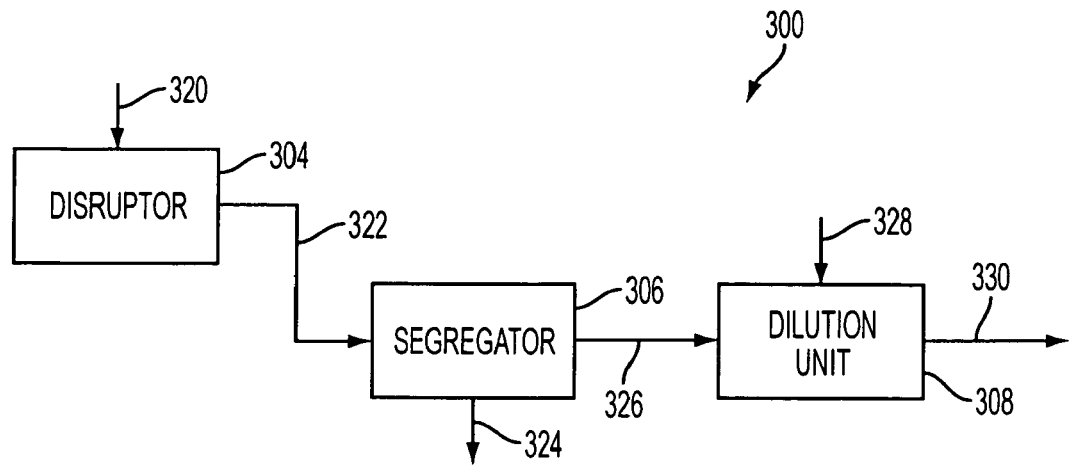
FIG. 3 illustrates a simplified bloc % diagram illustrating an exemplary system for processing waste in accordance with an embodiment of the present invention.

FIG. 3 illustrates a schematic block diagram illustrating an exemplary embodiment of a system for processing waste in accordance with the present invention. Exemplary system 300 includes waste disruptor 304, segregator 306, and dilution unit 308.

Waste disruptor 304 may be any suitable apparatus or device that performs steps 104 or 204, as described herein. Waste disruptor 304 receives waste 320, examples of which are described herein. Waste 320 can be provided continuously, in batches, or any suitable combination thereof.

Disruptor 304 is configured to disrupt waste is in the manner described herein, generating disrupted waste 322 from at least a portion of waste 320. Disrupted waste 322 can be generated continuously, in batches, or any suitable combination thereof. In addition, disrupted waste 322 can be generated processively, in which the degree and/or extent of disruption waste 320 increases as the waste proceeds through the disrupter.

Segregator 306 may be any suitable apparatus or device that performs steps 106 or 206, as described herein. At least a portion of disrupted waste 322 is subjected to segregator 306. Disrupted waste 322 can be subjected to the segregator continuously, in batches, or any suitable combination thereof. As described herein, segregator 306 may be configured as to the criteria and magnitude of separation between the hard particulates and the disrupted waste. Released hard particulates 324, following segregation from disrupted waste 322, may be removed from segregator 306. This removal may be continuous (e.g. during segregation) or in one or more batches (e.g. following at least a substantial amount of segregation). In some embodiments, released hard particulates 324 may be retained in segregator 306, while segregated disrupted waste 326 is conveyed or removed. In such embodiments, the retained hard particulates may be removed later.

Dilution unit 308 may be any suitable apparatus or device that performs steps 108 or 208, as described herein. Dilution unit 308 can dilute disrupted waste 326 continuously, in batches, or any suitable combination thereof. At least a portion of segregated waste 326 is subjected to dilution by dilution unit 308. Diluent 328 may be provided to dilution unit 308 prior to, following, essentially concurrently with, or any suitable combination thereof to receiving disrupted waste 326. Diluted waste 330 can be generated continuously, in batches, or any suitable combination thereof.

Referring to system 300, it is understood that in certain embodiments of the present invention, suitable combinations or sub-combinations of disruptor 304, segregator 306, and dilution unit 308 may be combined or integrated as a single device.

Figure 4:
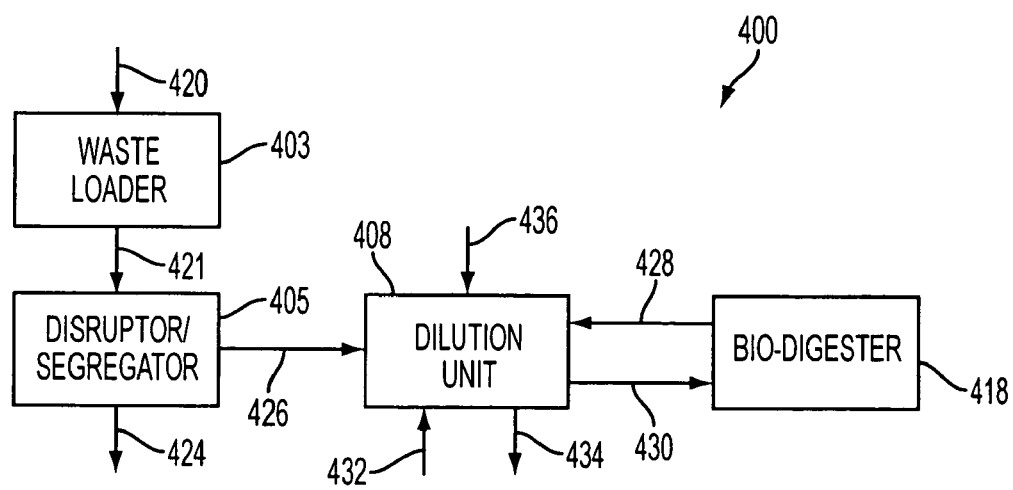
FIG. 4 illustrates a simplified block diagram of an exemplary system for processing waste in accordance with an embodiment of the present invention.

FIG. 4 illustrates a schematic block diagram of an exemplary system 400 for processing waste in accordance with an embodiment of the present invention. System 400 can include waste loader 403, waste disruptor/segregator 405, dilution unit 408 and anaerobic bio-digester 418.

Waste loader 403 is a suitable device that can perform loading waste step 203 described herein. In one embodiment, waste loader 403 can be a hopper, conveyer, or any other suitable device or apparatus that can provide waste 420. Waste loader can provide waste 420 continuously, in batches, or any suitable combination thereof.

Waste disruptor/segregator 405 receives the waste from waste loader 403 and performs steps 104 and 106, or steps 204 and 206. These two steps may be performed essentially concurrently, serially, overlapping, or any suitable combination thereof. As in system 300, disruptor/segregator 405 may also be separated components, in which the disruption and segregation steps are performed by separate components.

As with segregator 306 of system 300 (in FIG. 3), particulates 424 segregated from disrupted waste 426 may be removed from disruptor/segregator 405, or may be retained therein for later removal.

Dilution unit 408 may be any suitable apparatus or device that performs steps 108 or 208, as described herein. Dilution unit 408 can dilute segregated disrupted waste 426 continuously, in batches, or any suitable combination thereof. At least a portion of segregated waste 426 is subjected to dilution by dilution unit 408. Diluent 436 may be provided to dilution unit 408 prior to, following, essentially concurrently with, or in any suitable combination thereof to disrupted waste 426. Diluted waste 430 can be generated continuously, in batches, or in any suitable combination thereof.

In some embodiments, dilution unit 408 may include a mixing means, such as described in step 214 herein. In some embodiments, heat 432 may be provided to dilution unit 408, such as described herein regarding step 210 of FIG. 2. Heat may be provided directly to the unit, or may be introduced via heating of diluent 436.

Some embodiments of system 400 may include anaerobic bio-digester 418. As is known in the art, certain species of micro-organisms, such as methanogenic bacteria, can grow and metabolize in a substantially anaerobic environment. Further, such species produce methane and other gases as by-products. Thus, exemplary anaerobic bio-digesters of the present invention are configured to allow anaerobic growth, and may be further configured to capture or collect methane and other volatile/gaseous products produced by bacterial metabolism, also known as biogas.

Thus, diluted waste 430 may be provided to anaerobic bio-digester 418 as a nutrient source for anaerobic bacteria. In some embodiments, such as when waste 430 comprises livestock manure, the waste itself may already contain suitable anaerobic bacterial species to allow digestion under anaerobic conditions.

Upon anaerobic digestion of at least a portion of the waste, biodigestate is also produced. Biodigestate includes at least partially nutrient-depleted media resulting from anaerobic bacterial growth, as well as the bacteria. Biodigestate may include other volatile and non-volatile metabolites from bacteria growth. The solid content of biodigestate may also vary, depending on the extent of digestion, the initial moisture/solid content of the waste, and the amount of water added to or removed from the bio-digester during the digestion.

As shown in FIG. 4, biodigestate 428 from bio-digester 418, or a substantially liquid component thereof, may be conveyed to dilution unit 408 as diluent 436, and used in the manner described herein. In some embodiments, returned biodigestate 428 may be heated, thereby introducing heat to diluted waste 430. Using liquid biodigestate can be advantageous compared to using other liquid diluents, such as water, because compounds in the liquid biodigestate can accelerate the dilution of the waste, and make diluted waste 430 more suitable and amenable for anaerobic biodigestion.

Figure 5A:
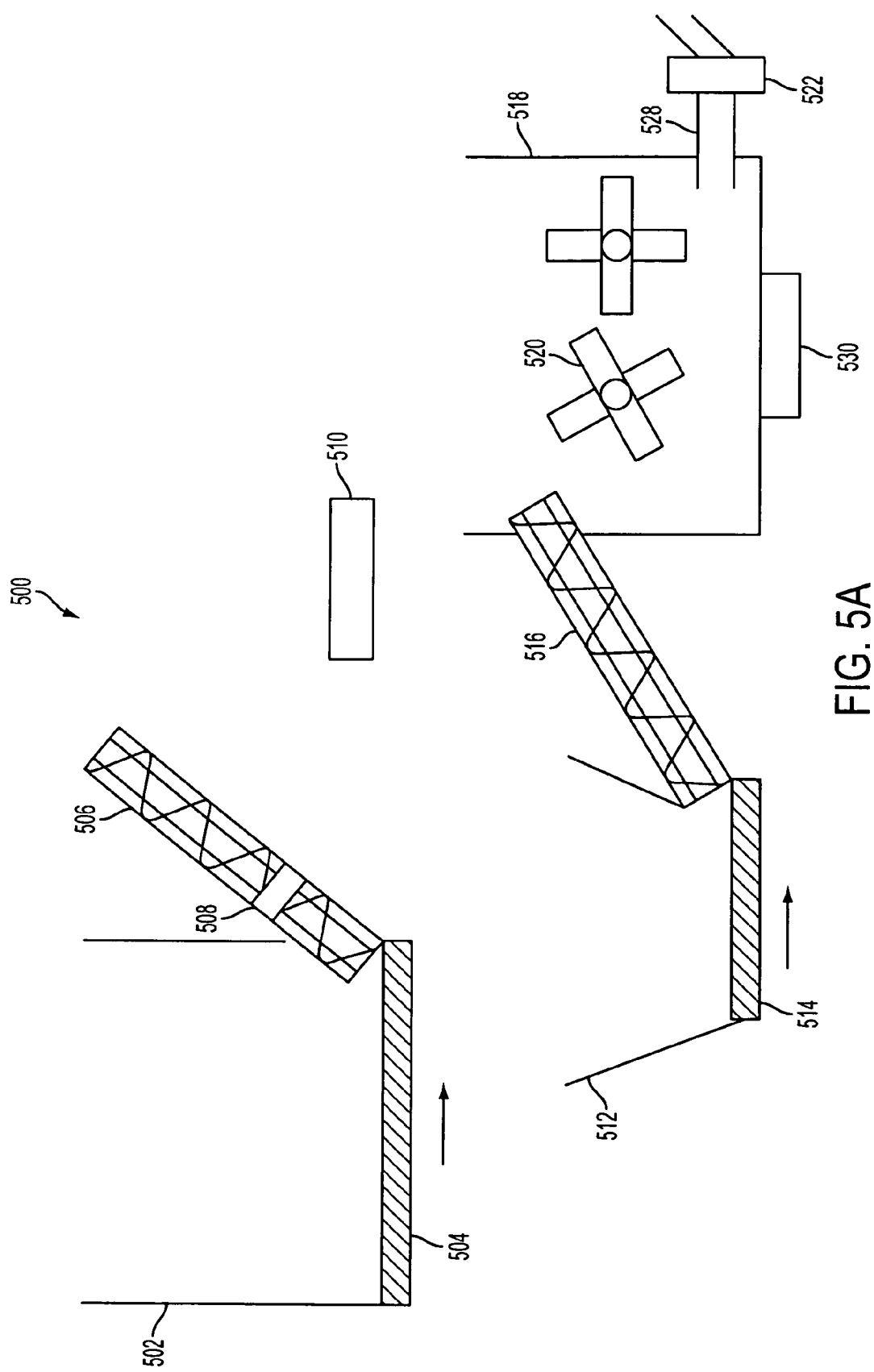
FIGS. 5A-5B illustrate a side view and a top view, respectively, of an exemplary system for processing waste in accordance with an embodiment of the present invention.
Figure 5B:
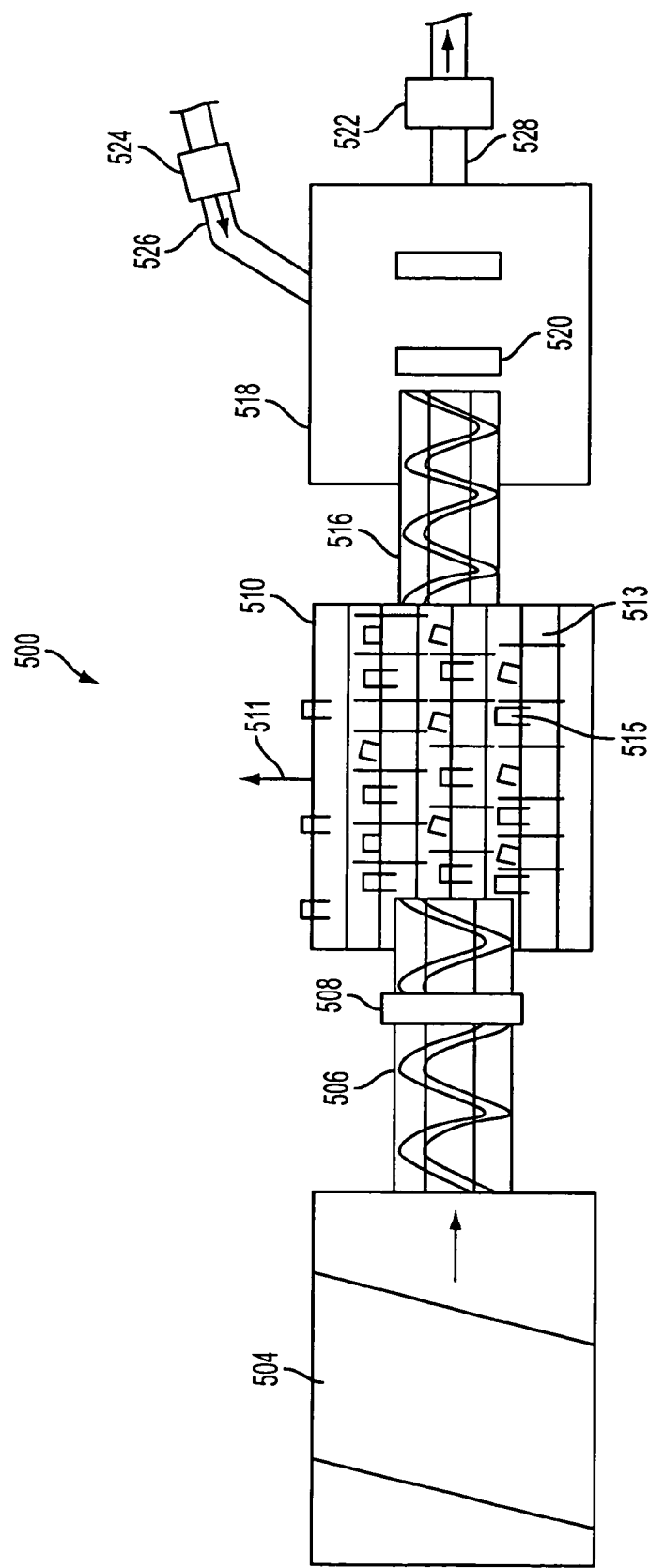

FIGS. 5A-5B illustrate a side view and a top view, respectively, of exemplary system 500 for processing waste in accordance with an embodiment of the present invention. Waste processing system 500 can include container 502, conveying system 504, open auger 506, disrupter bar 508, rotary screener 510, disrupted waste container 612, conveying system 614, auger 616, container 519, paddles 520, pump 522, and macerator 524.

System 500 illustrates a preferred exemplary embodiment of the present invention, wherein waste disruption, release of hard particulates from the disrupted waste, and segregation of released hard particulates from the disrupted waste can take place at substantially the same time (e.g., upon impact with a disrupter bar or other structure).

In FIGS. 5A and 5B, waste can be deposited into system 500 through the open top of container 502. Conveying system 504 is configured to convey the waste within container 502 towards the proximal end of open auger 506. Conveying system 504 can be any known device that can transport solid or semi-solid material, such as a walking floor, a conveyer belt, a slatted chain floor, or the like.

Open auger 506, similar to augers known in the art, is configured to convey waste from its proximal end to its distal end upon appropriate rotation of the auger along its longitudinal axis. As a result, waste is generally conveyed out of container 502. Open auger 506 is further configured to allow waste material that is being conveyed therein to prematurely exit the auger, such as by falling out from the top or sides of the auger. Open auger 506 can be angled upwards in some embodiments, such that at least some of the waste material that exits open auger 506 falls back into container 502. In certain preferred embodiments, open auger 506 can be positioned at an approximate 45 degree angle, wherein the distal end is elevated with respect to the proximal end. Open auger 606 can also be positioned to be angled downwards, or can be positioned to be substantially level. While one open auger is shown in system 500, the present invention is not limited in this regard, such that multiple open augers, operating substantially in parallel, can be used to transport waste from container 602. In certain preferred embodiments, three open augers can be used in this manner.

While being conveyed by open auger 506, waste can be disrupted by disrupter bar 508. Disruptor bar 508 is positioned at a pre-determined proximity with respect to open auger 506 such that the disrupter bar and the auger acts as a size exclusion device on material being conveyed by the auger. This proximity is configured such that material being conveyed by open auger 506 must be less than a pre-determined size parameter (e.g., average diameter) in order to continue conveyance by the auger. Objects within the material, such as hard particulates embedded within the waste, that are larger than the pre-determined size parameter (e.g., having an average diameter less than about 6, 8, 10, or 12 centimeters) will collide with disrupter bar 508 and thus be dislodged from the waste. Smaller particulates can continue to be conveyed by the auger. Likewise, disrupted waste, which can be fractured or broken upon impacting disrupter bar 508, can also continued to be conveyed.

When such larger hard particulates are dislodged and released by disrupter bar 508, they can also be segregated from the waste. In some embodiments, the released hard particulates can then fall down the length or over the sides of open auger 606 back into container 502. In this manner, such released hard particulates are segregated from the disrupted waste.

Disruptor bar 508 can be positioned at any suitable location along the length of open auger 506. In certain preferred embodiments, disruptor bar 508 can be positioned proximate to the underside of open auger 506. It is preferred to position disrupter bar 508 at a position along the auger such that hard particulates released upon impact with the disruptor bar fall back into container 502. Disruptor bar 508 can be composed of any suitable material, and is preferably composed of a material having sufficient hardness and durability to withstand repeated collisions with hard particulates.

Waste conveyed by open auger 506 can exit the auger's distal end, and be deposited on rotary screener 510. Rotary screener 510 is configured to disrupt the waste further, thereby releasing additional hard particulates from the waste. Rotary screener 510 can include a plurality of rotating cylindrical flights, such as flight 513, which can be mechanically powered. In some embodiments, the flights are configured to rotate in the same direction, such as shown by directional arrow 511. Rotary screener 510 contains flights chat are substantially at the same height as the other flights; however, in some embodiments, the flights can be at different heights (e.g., rotary screener sib can be angled), which can assist in directing segregated hard particulates in one direction. While in the embodiment shown in system 500 utilizes cylindrical flights, the present invention is not limited in this regard, and the flights may be of any shape that can be rotated about a longitudinal axis. Flight 513 includes a plurality of grooves, and a plurality of protuberances, such as protuberance 515, which can enhance disruption of waste when waste comes into contact with flight 513.

Waste disrupted by rotary screener 510 can fall between the flights into container 512, positioned therebelow. Hard particulates that are released from the disrupted waste, due to their size and/or hardness, will not pass between the flights. Instead, such hard particulates are segregated from the waste by being conveyed across the rotary screener by the flights, typically in the direction of flight rotation 511. By adjusting the space between flights, rotary screener 510 can be configured to segregate hard particulates of any pre-determined size, with the disrupted waste passing between the flights. Rotary screener 510, in some embodiments, is configured to segregate smaller hard particulates than disrupter bar 508 (e.g. 2 cm in average diameter or less).

In some embodiments, a conveying system (not shown) can be installed to receive segregated hard particulates are expelled from rotary screener 510. This conveying system is configured to remove the segregated hard particulates from the rotary screener. In some embodiments, a container (not shown) can be placed can be positioned to collect segregated hard particulates that are expelled from rotary screener 510. This container can be emptied periodically to prevent excessive buildup or cluttering caused by the segregated hard particulates.

Waste that passes through rotary screener 510 can fall into container 512 positioned therebelow, where it can be conveyed by conveying system 514 towards the proximal end of auger 516. Auger 516, in a manner similar to that of auger 506, can convey waste from its proximal end to its distal end, thereby removing the conveyed waste from container 512. Auger 516 can be angled upwards in some embodiments, as shown in system 500. Auger 516 can also be positioned to be angled downwards or substantially level. While a single auger is shown in system 500, the present invention is not limited in this regard, such multiple augers operating substantially in parallel can be used to remove waste from container 512.

In some embodiments, auger 516 can be optionally substituted with one or more conveying systems, such as rotary paddles (not shown), that are positioned to urge material from container 512 to be deposited on a rotary screener (not shown), similar to rotary screener 510. In this manner, the foregoing rotary screener can further disrupt and segregate waste from container 512. Such segregated waste can then be conveyed to or deposited in container 518.

Waste can be conveyed by auger 516 into container 518. In container 518, waste can be diluted with one or more liquid diluents. Container 518 is preferably enclosed. Such an enclosure can be advantageous in embodiments where container 518 shares an atmosphere with an anaerobic bio-digester because it can prevent oxygen or other contaminating material from entering the anaerobic bio-digester. In some embodiments, container 518 can be sealed to prevent or minimize exposure to air. Water can be used as a diluent for the waste in container 518. Water can be added to the waste using any known method of conveying a liquid (not shown). The water can be pre-heated in some embodiments. A preferred diluent, which can used in addition to or instead of water, is biodigestate. Biodigestate can include lignin-containing materials (e.g., straw), as described hereinabove. The biodigestate can be removed directly from an anaerobic bio-digester. In certain preferred embodiments, the biodigestate is removed from the anaerobic bio-digester at the depth where the density corresponds to that of the most digested material. Removing biodigestate at this depth can be advantageous, as it removes the more digested waste, thereby enriching the remaining bio-digester contents with the leas digested waste for further digestion.

In some embodiments, biodigestate can enter container 518 through pipe 526, and can be macerated by macerator 524. Macerator 524 breaks up the biodigestate, particularly the lignin-containing materials contained therein, so as to facilitate dilution, pumping of the diluted waste, and to prevent interference with subsequent biodigestion processes. Macerator 524 can be any commercially available macerator. For example, macerator 524 may use counter-rotating blades that can grind the biodigestate. Macerating the biodigestate can also be advantageous because breaking up the lignin-containing materials can promote anaerobic biodigestion of these lignin-containing materials which, prior to maceration, are substantially undigested. Maceration can thereby increase overall biogas output.

After, or during, dilution, the waste can be mixed by agitators, such as paddle 520. Paddle 520 can rotate about its axis and thereby mix the waste. Diluted waste can be removed from container 518 through pipe 528 using pump 522. Diluted waste can be removed from container 518 continuously in some embodiments, which can reduce down time. In other embodiments, diluted waste can be removed from container 518 in batches, which can allow for more thorough dilution of the waste and/or more complete mixing.

During the aforementioned dilution and mixing of waste in container 516, grit, sand, and other denser particulates can be allowed to settle out from the diluted waste to the bottom of the container. Such settled material can be removed by conveying system 530. In this manner, the diluted waste can be advantageously depleted of such particulates, which may interfere with later processes, such as biodigestion.

In some embodiments, an in-line macerator can be configured to macerate the diluted waste passing through pipe 528. Such embodiments can be advantageous because the waste may contain lignin-containing materials, which can interfere with pumping and subsequent anaerobic biodigestion processes.

While preferred illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed is:

1. A method of processing organic waste, wherein the waste comprises hard particulates embedded therein, the method comprising:
   (1) disrupting at least a portion of the organic waste, thereby releasing at least one of the embedded hard particulates from the waste;
   (2) segregating at least one of the hard particulates released from the waste; and,
   (3) diluting the waste with a liquid diluent, wherein the liquid diluent comprises liquified biodigestate from an anaerobic bio-digester.

2. The method of claim 1, further comprising:
   (4) providing the waste continuously, wherein the disrupting at least a portion of the waste comprises disrupting at least a portion of the continuously provided waste.

3. The method of claim 1, wherein the segregating at least one of the released hard particulates comprises segregating at least one of the released hard particulates based on a predetermined minimum size of the released hard particulates.

4. The method of claim 3, wherein the predetermined minimum size is a mean diameter of about 8 centimeters.

5. The method of claim 3, wherein the segregating at least one of the released hard particulates based on a predetermined minimum size comprises subjecting the released hard particulates and the waste to size exclusion.

6. The method of claim 5, wherein the size exclusion is configured to exclude hard particulates having the predetermined minimum size.

7. The method of claim 6, wherein the predetermined minimum size is a mean diameter of about 8 centimeters.

8. The method of claim 1, wherein the disrupting the waste comprises impacting the waste with at least one protuberance.

9. The method of claim 1, wherein the waste further comprises metal contaminants, the method further comprising removing at least one of the metal contaminants from the waste.

10. The method of claim 9, wherein the removing at least one of the metal contaminants comprises magnetically removing at least one of the metal contaminants from the waste.

11. The method of claim 1, wherein a disruptor bar is positioned proximate an open auger conveying the waste, thereby forming a size exclusion gap therebetween, wherein the disrupting comprises impacting the conveyed waste with the disruptor bar, thereby releasing at least one of the embedded hard particulates, and wherein the segregation comprises excluding at least one of the released hard particulates having a size greater than the size exclusion gap.

12. The method of claim 1, wherein the disrupting at least a portion of the waste comprises depositing the waste on a rotary screener, thereby releasing at least one of the embedded hard particulates.

13. The method of claim 1, wherein the diluting the waste step comprises diluting the waste until the solid content of the waste is about 12-13%.

14. The method of claim 1, further comprising heating the waste.

15. The method of claim 1, wherein the liquid diluent has a higher temperature than the waste.

16. The method of claim 1, wherein the diluting the waste further comprises paddle mixing the diluted waste.

17. The method of claim 1, further comprising conveying the diluted waste to an anaerobic bio-digester.

18. The method of claim 1, wherein the disrupting comprises impacting the waste on a size exclusion apparatus, and wherein the segregating comprises excluding released hard particulates using the size exclusion apparatus.

19. The method of claim 1, wherein said organic waste comprises livestock manure, animal carcasses and offal, plant material, wastewater, sewage, food processing waste, human-derived waste, discarded food, or a mixture thereof.

20. The method of claim 1, wherein said embedded hard particulates comprise rocks, metals, or inorganic contaminants that (1) do not undergo biological digestion or decomposition, (2) are resistant to physical forces, or (3) are insoluble.

21. The method of claim 1, wherein said organic waste, prior to step (3), is in low-moisture/high-solid form.

22. A system for processing organic waste, wherein the waste comprises hard particulates embedded therein, the system comprising:
   (1) a waste disruptor, wherein the waste disruptor disrupts at least a portion of the organic waste and releases at least one of the embedded hard particulates from the waste;
   (2) a segregator, wherein the segregator segregates at least one of the released hard particulates from the waste; and
   (3) a dilution unit, wherein the dilution unit dilutes the waste with a liquid diluent, and is configured to convey the diluted waste to an anaerobic bio-digester, wherein the liquid diluent comprises liquefied biodigestate from an anaerobic bio-digester.

23. The system of claim 22, further comprising a waste loader that provides the waste continuously to the waste disruptor, wherein the waste disruptor is configured to disrupt at least a portion of the continuously provided waste.

24. The system of claim 22, wherein the segregator is configured to segregate at least one of the released hard particulates based on a predetermined minimum size of the released hard particulates.

25. The system of claim 24, wherein the predetermined minimum size is a mean diameter of about 8 centimeters.

26. The system of claim 22, wherein the waste disruptor disrupts the waste by impacting the waste with at least one protuberance.

27. The system of claim 22, wherein the waste further comprises metal contaminants, wherein the dilution unit is further configured to remove at least one of the metal contaminants from the waste.

28. The system of claim 27, wherein the dilution unit further comprises magnets and is configured to remove at least one of the metal contaminants from the waste magnetically.

29. The system of claim 22, wherein the waste disruptor is configured to impact the waste on a size exclusion apparatus; wherein the segregator is configured to exclude released hard particulates using the size exclusion apparatus.

30. The system of claim 22, wherein the segregator comprises a size exclusion apparatus, wherein the size exclusion apparatus is configured to exclude at least one of the released hard particulates.

31. The system of claim 30, wherein the size exclusion apparatus is further configured to exclude hard particulates having a predetermined minimum size.

32. The system of claim 31, wherein the predetermined minimum size is a diameter of about 8 centimeters.

33. The system of claim 22, wherein the waste disruptor and the segregator are integrated.

34. The system of claim 22, wherein the dilution unit dilutes the waste until the solid content of the waste is about 12-13%.

35. The system of claim 22, wherein the liquid diluent has a higher temperature than the waste.

36. The system of claim 22, further comprising a heat source, wherein the heat source is configured to heat the waste while in the dilution unit.

37. The system of claim 22, wherein the dilution unit further comprises a mixing unit, wherein the mixing unit is configured to mix the diluted waste.

38. The system of claim 37, wherein the mixing unit comprises a paddle, and is configured to paddle mix the diluted waste.

* * * * *